(12) United States Patent
Song et al.

(10) Patent No.: US 12,489,173 B2
(45) Date of Patent: Dec. 2, 2025

(54) SECONDARY BATTERY (71) Applicant: LG Energy Solution, Ltd., Seoul (KR)

(72) Inventors: Dae-Woong Song, Daejeon (KR);
Sang-Hun Kim, Daejeon (KR);
Min-Hyeong Kang, Daejeon (KR);
Hyung-Kyun Yu, Daejeon (KR);
Hun-Hee Lim, Daejeon (KR); Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/719,806

(22) Filed: Apr. 13, 2022

(65) Prior Publication Data

US 2022/0336918 A1    Oct. 20, 2022

(30) Foreign Application Priority Data

Apr. 15, 2021  (KR) .................. 10-2021-0049378
Nov. 4, 2021   (KR) .................. 10-2021-0150951

(51) Int. Cl.
  *H01M 50/375*    (2021.01)
  *C08F 210/02*    (2006.01)
  (Continued)

(52) U.S. Cl.
  CPC ......... *H01M 50/375* (2021.01); *C08F 210/02* (2013.01); *H01M 50/105* (2021.01);
  (Continued)

(58) Field of Classification Search
  CPC ............ H01M 50/105; H01M 50/375; H01M 50/3425; H01M 2200/10; H01M 2200/20;
  (Continued)

(56) References Cited

U.S. PATENT DOCUMENTS 8,546,499 B2   10/2013   Garroff et al.
8,597,775 B2   12/2013   Rhee et al.
(Continued)

FOREIGN PATENT DOCUMENTS

EP   4191775 A1   6/2023
JP   S6225140 A   2/1987
(Continued)

OTHER PUBLICATIONS

Packaging Technology: 13—Plastics properties for packaging materials, 2012, Woodhead Publishing, pp. 287-309, ISBN 9781845696658, https://doi.org/10.1533/9780857095701.2.287. (Year: 2012).*
(Continued)

*Primary Examiner* — Haroon S. Sheikh
(74) *Attorney, Agent, or Firm* — Lerner David LLP (57) ABSTRACT

The secondary battery includes an electrode assembly to which an electrode lead is attached; a case configured to receive the electrode assembly therein; a lead film configured to surround a part of an outer surface of the electrode lead and interposed between the electrode lead and the case; a vent region formed in at least a part of the case; and a vent member inserted into the vent region and configured to contain linear low-density polyethylene having a comonomer with a carbon number of 6 or more.

22 Claims, 6 Drawing Sheets (51) Int. Cl.
*H01M 50/105* (2021.01)
*H01M 50/342* (2021.01)

(52) U.S. Cl.
CPC ..... *H01M 50/3425* (2021.01); *C08F 2500/08* (2013.01); *C08F 2500/33* (2021.01); *C08F 2500/34* (2021.01); *H01M 2200/10* (2013.01)

(58) Field of Classification Search
CPC .............. C08F 2500/08; C08F 2500/33; C08F 2500/34; C08F 210/02; C08F 210/14; H01N 2200/10
See application file for complete search history.

(56) References Cited

U.S. PATENT DOCUMENTS

| | | | | |
|---|---|---|---|---|
| 2001/0038938 | A1* | 11/2001 | Takahashi | H01G 2/18 429/185 |
| 2003/0148173 | A1 | 8/2003 | Gu | |
| 2004/0038126 | A1* | 2/2004 | Gu | H01M 50/191 429/185 |
| 2008/0233468 | A1 | 9/2008 | Otohata et al. | |
| 2011/0143176 | A1* | 6/2011 | Otohata | H01M 50/325 29/623.2 |
| 2012/0053308 | A1* | 3/2012 | Garroff | C08F 210/16 526/124.7 |
| 2013/0122336 | A1 | 5/2013 | Park et al. | |
| 2016/0197318 | A1 | 7/2016 | Yamashita et al. | |
| 2017/0244082 | A1* | 8/2017 | Ahn | H01M 50/325 |
| 2017/0331089 | A1 | 11/2017 | Hashimoto et al. | |
| 2022/0105714 | A1 | 4/2022 | Du et al. | |
| 2023/0378593 | A1 | 11/2023 | Kim et al. | |

FOREIGN PATENT DOCUMENTS

| | | |
|---|---|---|
| JP | H0649808 B2 | 6/1994 |
| JP | H09150489 A | 6/1997 |
| JP | 2000047467 A | 2/2000 |
| JP | 2001072788 A | 3/2001 |
| JP | 2001164229 A | 6/2001 |
| JP | 2001273884 A | 10/2001 |
| JP | 2001283800 A | 10/2001 |
| JP | 2003242952 A | 8/2003 |
| JP | 2005103955 A | 4/2005 |
| JP | 2005116474 A | 4/2005 |
| JP | 2006324174 A | 11/2006 |
| JP | 2008293392 A | 12/2008 |
| JP | 2011524822 A | 9/2011 |
| JP | 2013105743 A | 5/2013 |
| JP | 2017062872 A | 3/2017 |
| JP | WO2016132404 A1 | 8/2017 |
| JP | 2018060753 A | 4/2018 |
| JP | 2019142018 A | 8/2019 |
| JP | 2020015221 A | 1/2020 |
| JP | 2022518742 A | 3/2022 |
| KR | 20030066895 A | 8/2003 |
| KR | 20110131259 A | 12/2011 |
| KR | 20140035462 A | 3/2014 |
| KR | 20150055775 A | 5/2015 |
| KR | 20160058514 A | 5/2016 |
| KR | 20170068332 A | 6/2017 |
| KR | 20190047104 A | 5/2019 |
| WO | 2018088257 A1 | 5/2018 |

OTHER PUBLICATIONS

International Search Report for PCT/KR2022/005442 mailed Aug. 1, 2022. 3 pgs.

International Search Report for PCT/KR2022/005443 mailed Aug. 1, 2022. 3 pgs.

Third-Party Submission Under 37 CFR 1.290 for U.S. Appl. No. 17/719,837, dated Feb. 15, 24. 24 pages.

Effects of branching characteristics and copolymer composition distribution on non-isothermal crystallization kinetics of metallocene LLDPEs, European Polymer Journal 43 (2007), Elsevier, Dec. 2006, pp. 599-610.

Effect of Crystallinity of Polyethylene with Different Densities on Breakdown Strength and Conductance Property, Materials, May 2019, 12, 1746, pp. 1-13 (Year: 2019).

Extended European Search Report including Written Opinion for Application No. 22788483.0 dated Jan. 22, 25. 9 pages.

Toshio Sasaki et al: "Synthesis of Polyolefins by Metallocene Catalysts", Sumitomo Chemical Industry Co., Ltd. Chiba Laboratory, Special Issue—New Developments in Polymer Synthesis, vol. 42, Nov. 1993, 907-910pg.

Polymers 2019, 11,434; Yi Ren et. al. Different Dependence of Tear Strength on Film Orientation of LDFDE Made with Different Co-Monomer. 13 pgs.

Jis Z 0238: 1998, Testing methods for heat sealed flexible packaging bags and semi-rigid containers. 26 pgs.

https://plabase.com/details/resin/C6-LLDPE, (2017) DB C6-LLDPE, PlaBase. 3 pgs.

Yi Ren, et al., Different Dependence of Tear Strength on Film Orientation of LLDPE Made with Different Co-Monomer, Polymers, 11(3), 434, Mar. 6, 2019, 13 pages.

\* cited by examiner

SECONDARY BATTERY

CROSS-REFERENCE TO RELATED APPLICATIONS

The present application claims priority to Korean Patent Application No. 10-2021-0049378 filed on Apr. 15, 2021 and Korean Patent Application No. 10-2021-0150951 filed on Nov. 4, 2021, the disclosures of which are incorporated herein by reference in their entirety.

TECHNICAL FIELD

The present disclosure relates to a secondary battery, and more particularly, to a secondary battery having a vent member.

BACKGROUND

Secondary batteries are highly applicable to various products and exhibit superior electrical properties such as high energy density, etc. Secondary batteries are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like.

The secondary battery generally has a structure in which an electrode assembly including at least one unit cell having a positive electrode/separator/negative electrode structure is accommodated in a case of a laminate sheet in which an outer layer, a metal barrier layer and a sealant layer are sequentially laminated, and a sealant resin of the sealant layer is fused to seal the electrode assembly is sealed.

In the conventional secondary battery, the battery may ignite due to various causes such as a short circuit inside the secondary battery, overcharge or overdischarge, temperature control, or the like. At this time, thermal propagation where the temperature inside the secondary battery rises rapidly and simultaneously the heat is transferred to neighboring cells may be generated, which may further increase the fire.

In order to minimize damage to the electrode caused by gas when thermal propagation occurs—i.e., when the internal temperature of the secondary battery rises, the directional venting characteristic is required to discharge the gas in one direction. However, the conventional secondary battery has a problem in that it is difficult to induce gas discharge in a specific direction.

Therefore, the present disclosure is directed to providing a secondary battery with improved safety by inducing gas discharge in a specific direction.

BRIEF SUMMARY OF THE INVENTION

Disclosed herein are secondary batteries with a vent member.

In accordance with an aspect of the present disclosure, there is provided a secondary battery. The secondary battery may include an electrode assembly to which an electrode lead is attached; a case configured to receive the electrode assembly therein; a lead film configured to surround a part of an outer surface of the electrode lead and interposed between the electrode lead and the case; a vent region formed in at least a part of the case; and a vent member inserted into the vent region and configured to contain linear low-density polyethylene having a comonomer with a carbon number of 6 or more.

Continuing in accordance with this aspect, the vent member may contain linear low-density polyethylene having a comonomer with a carbon number of 6 to 8.

Continuing in accordance with this aspect, the case may include a sealing portion formed to seal the electrode assembly. The sealing portion may contain a sealant resin. The vent member containing the linear low-density polyethylene having a comonomer with a carbon number of 6 or more may have a lower melting point than the sealant resin.

Continuing in accordance with this aspect, the vent member may melt at 100° C. to 120° C. to vent gases.

Continuing in accordance with this aspect, the vent member may be vented at a pressure of 1.5 atm or more.

Continuing in accordance with this aspect, the vent member may have a maximum sealing strength of less than 6 kgf/15 mm at 100° C. or above.

Continuing in accordance with this aspect, the vent member may have an average sealing strength of less than 4.5 kgf/15 mm at 100° C. or above.

Continuing in accordance with this aspect, the vent member may have a maximum sealing strength of 6 kgf/15 mm or more at room temperature to 60° C.

Continuing in accordance with this aspect, the vent member may have an average sealing strength of 4.5 kgf/15 mm or more at room temperature to 60° C.

Continuing in accordance with this aspect, the linear low-density polyethylene may be polymerized in the presence of a metallocene catalyst.

Continuing in accordance with this aspect, in the linear low-density polyethylene having a comonomer with a carbon number of 6 or more, the content of the comonomer with a carbon number of 6 or more may be 15 weight % or less, based on 100 weight % of the linear low-density polyethylene containing the comonomer with a carbon number of 6 or more.

Continuing in accordance with this aspect, the linear low-density polyethylene may have a poly dispersity index (PDI) of 4 or less.

Continuing in accordance with this aspect, a difference between a crystallization temperature of the sealant resin and a crystallization temperature of the linear low-density polyethylene may be 10° C. or less.

Continuing in accordance with this aspect, the linear low-density polyethylene may have a crystallization temperature of 90° C. to 115° C.

Continuing in accordance with this aspect, the linear low-density polyethylene may have a melting point of 100° C. to 130° C.

Continuing in accordance with this aspect, the linear low-density polyethylene may have a weight-average molecular weight of 100,000 g/mol to 400,000 g/mol.

Continuing in accordance with this aspect, the vent region may be located in the sealing portion.

Continuing in accordance with this aspect, the vent region may be located in a sealing portion at a corner of the case.

Continuing in accordance with this aspect, the secondary battery may be a pouch-type secondary battery.

Continuing in accordance with this aspect, the vent member may have a maximum sealing strength of less than 6 kgf/15 mm at 100° C. to 120° C.

Continuing in accordance with this aspect, the vent member may have an average sealing strength of less than 4.5 kgf/15 mm at 100° C. to 120° C.

Continuing in accordance with this aspect, in the linear low-density polyethylene having a comonomer with a carbon number of 6 or more, the content of the comonomer with the carbon number of 6 or more may be from 5 weight % to 15 weight % based on 100 weight % of the linear low-density polyethylene.

Continuing in accordance with this aspect, the linear low-density polyethylene may have a poly dispersity index (PDI) of from 1 to 4.

Continuing in accordance with this aspect, the vent member may have a maximum sealing strength of less than 3 kgf/15 mm at 120° C. or more.

Continuing in accordance with this aspect, the vent member may have an average sealing strength of less than 2 kgf/15 mm at 120° C. or more.

A secondary battery according to an embodiment of the present disclosure may include a vent member containing linear low-density polyethylene having a comonomer with a carbon number of 6 or more, and thus it is possible to induce gas discharge toward the vent region. Accordingly, the safety of the battery is improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

A secondary battery according to one aspect of the present disclosure includes an electrode assembly to which an electrode lead is attached; a case configured to accommodate the electrode assembly; a lead film configured to surround a part of an outer surface of the electrode lead and interposed between the electrode lead and the case; a vent region formed in at least a part of the case; and a vent member inserted into the vent region and configured to contain linear low-density polyethylene having a comonomer with a carbon number of 6 or more.

Figure 1:
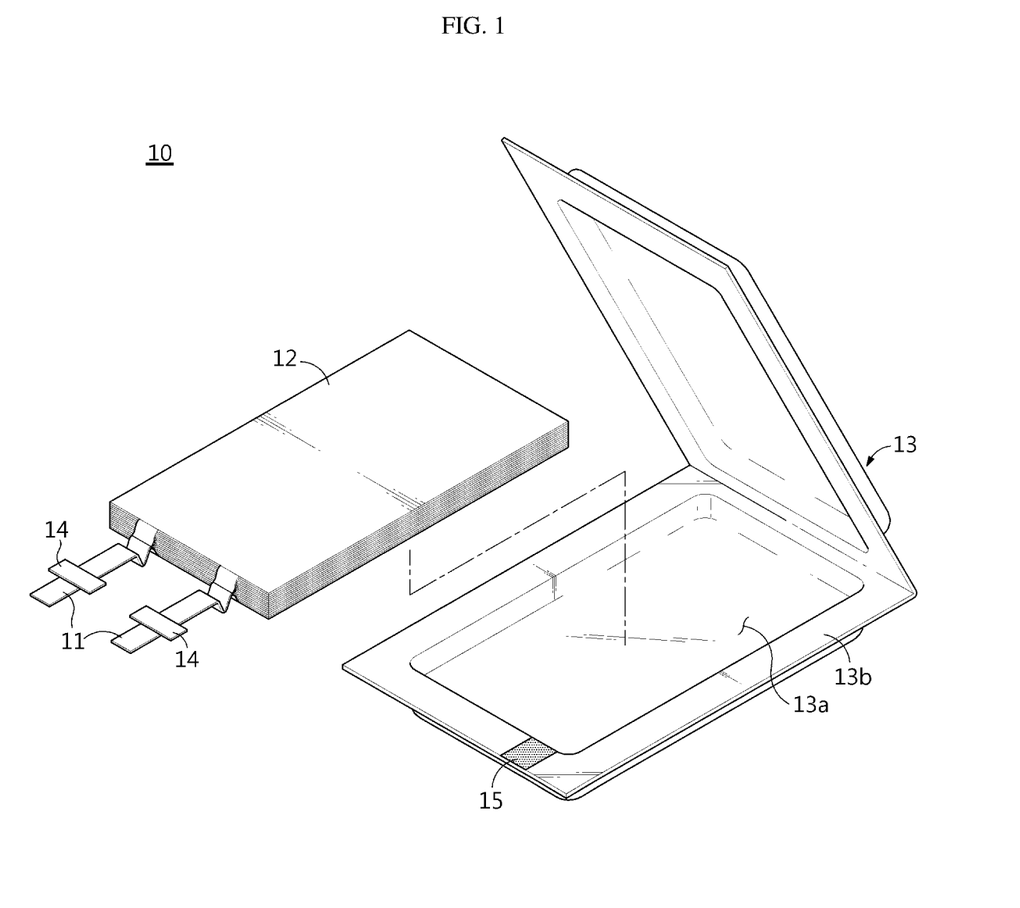
FIG. 1 is an exploded perspective view showing a secondary battery according to an embodiment of the present disclosure.
Figure 2:
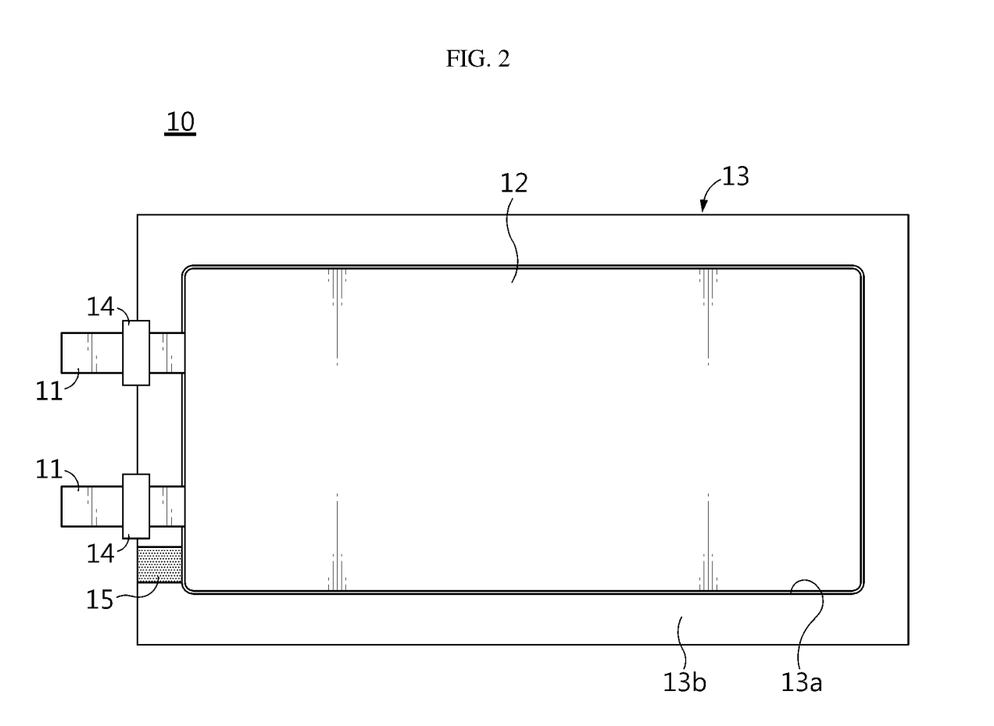
FIG. 2 is a plan view showing the secondary battery according to an embodiment of the present disclosure.

FIGS. 1 and 2 show a secondary battery according to an embodiment of the present disclosure.

A secondary battery 10 includes an electrode assembly 12 to which an electrode lead 11 is attached, and a case 13.

The electrode assembly 12 includes a positive electrode plate, a negative electrode plate and a separator. In the electrode assembly 12, a positive electrode plate and a negative electrode plate may be sequentially laminated with a separator being interposed therebetween.

The positive electrode plate may include a positive electrode current collector made of a metal thin film having excellent conductivity, for example an aluminum (Al) foil, and a positive electrode active material layer coated on at least one surface thereof. In addition, the positive electrode plate may include a positive electrode tab made of a metal material—for example, an aluminum (Al) material, at one side end thereof. The positive electrode tab may protrude from one side end of the positive electrode plate. The positive electrode tab may be welded to one side end of the positive electrode plate, or be bonded thereto using a conductive adhesive.

The negative electrode plate may include a negative electrode current collector made of a conductive metal thin film—for example, a copper (Cu) foil, and a negative electrode active material layer coated on at least one surface thereof. In addition, the negative electrode plate may include a negative electrode tab formed of a metal material, for example a nickel (Ni) material, at one side end thereof. The negative electrode tab may protrude from one side end of the negative electrode plate. The negative electrode tab may be welded to one side end of the negative electrode plate, or be bonded thereto using a conductive adhesive.

The separator is located between the positive electrode plate and the negative electrode plate to electrically insulate the positive electrode plate and the negative electrode plate from each other. The separator may be a porous membrane so that lithium ions can pass between the positive electrode plate and the negative electrode plate. The separator may include, for example, a porous membrane using polyethylene (PE), or polypropylene (PP), or a composite film thereof.

An inorganic coating layer may be provided on the surface of the separator. The inorganic coating layer may have a structure in which inorganic particles are bonded to each other by a binder to form an interstitial volume between the particles.

The electrode assembly 12 may be a jelly-roll (winding-type) electrode assembly having a structure in which long sheet-type positive and negative electrodes are wound with a separator being interposed therebetween, a stacked (stack-type) electrode assembly having a structure in which a plurality of positive and negative electrodes cut into units of a predetermined size are sequentially stacked with a separator being interposed therebetween, a stack/folding type electrode assembly having a structure in which bi-cells or full-cells where positive and negative electrodes of a predetermined unit are stacked with a separator being interposed therebetween are wound, or the like.

The case 13 serves to accommodate the electrode assembly 12.

In an embodiment of the present disclosure, the case 13 may include an accommodation portion 13a for accommodating the electrode assembly 12, and a sealing portion 13b formed to seal the electrode assembly 12 as shown in FIG. 1.

The sealing portion 13b may include a sealant resin, and the sealant resin may be fused along the outer circumference of the accommodation portion 13a to seal the electrode assembly 12.

In an embodiment of the present disclosure, the case 13 may be provided in a film form having a multilayer structure including an outer layer for protection against external impacts, a metal barrier layer for blocking moisture, and a sealant layer for sealing the case.

The outer layer may include a polyester-based film using poly(ethylene terephthalate) (PET), polybutylene terephthalate, polyethylene naphthalate, polybutylene naphthalate, co-polyester, polycarbonate, nylon, or the like, and may be configured in a single layer or multiple layers.

The metal barrier layer may include aluminum, copper, or the like.

The sealant layer may contain a sealant resin and may be configured in a single layer or multiple layers.

The sealant resin may include polypropylene (PP), acid-modified polypropylene (PPa), random polypropylene, ethylene propylene copolymer, or two or more thereof. The ethylene propylene copolymer may include, but is not limited to, ethylene-propylene rubber, ethylene-propylene block copolymer, and the like.

In an embodiment of the present disclosure, the case 13 may be in a pouch form.

The pouch-type battery case 13 may include an upper pouch and a lower pouch. If the case 13 includes an upper pouch and a lower pouch, after the upper pouch and the lower pouch are positioned so that the sealant resins thereof face each other, the facing sealant resins may be fused to each other by heat and pressure to have a structure that seals the battery.

The fusion of the sealing portion 13b may be thermal fusion, ultrasonic fusion, or the like, but is not particularly limited as long as the sealing portion 13b can be fused.

The sealing portion 13b may be sealed on four or three peripheral sides the case 13 in some embodiments. In the three-sided sealing structure, after the upper pouch and the lower pouch are formed on one pouch sheet, the boundary surface between the upper pouch and the lower pouch is bent so that the electrode assembly accommodation portions 13a formed on the upper pouch and the lower pouch overlap, and in this state, the edges of the remaining three sides are sealed except for the bending portion.

The electrode lead 11 may be accommodated in the case 13 so that a part thereof is exposed to the outside of the case 13 as shown in FIG. 1.

Secondary battery 10 according to an embodiment of the present disclosure includes a lead film 14. The lead film 14 surrounds a part of the outer surface of the electrode lead 11. and the lead film 14 is interposed between the electrode lead 11 and the case 13. For example, the lead film 14 may be interposed between the electrode lead 11 and the sealing portion 13b of the case 13 in a portion where the electrode lead 11 protrudes or extends away from case 13 to help the bonding of the electrode lead 11 and the case 13.

Referring to FIGS. 1 and 2, the secondary battery 10 according to an embodiment of the present disclosure has a vent region (not shown) formed in at least a part of the case 13, and a vent member 15 may be inserted into the vent region. When thermal propagation occurs, the vent member 15 may induce the discharge of gas in a specific direction, thereby improving the safety of the battery.

The vent member 15 and the case 13 may overlap by means of thermal fusion. In another example, the vent member 15 and the case 13 may be overlapped by means of an adhesive such as glue. In another example, the vent member 15 and the case 13 may be physically coupled to each other by means of a clip or the like. In another example, at least a part of the vent member 15 may be embedded in a film constituting the case 13, for example a sealant resin.

The vent member 15 contains linear low-density polyethylene having a comonomer with a carbon number of 6 or more. As the vent member 15 contains the linear low-density polyethylene having a comonomer of a carbon number of 6 or more, the sealing performance of the case 13 is excellent in the normal temperature range, for example, at room temperature to 60° C., and the sealing strength of the case in which the vent member 15 is inserted is lowered at high temperature, for example, 100° C. or above, thereby realizing or triggering venting.

Figure 3:
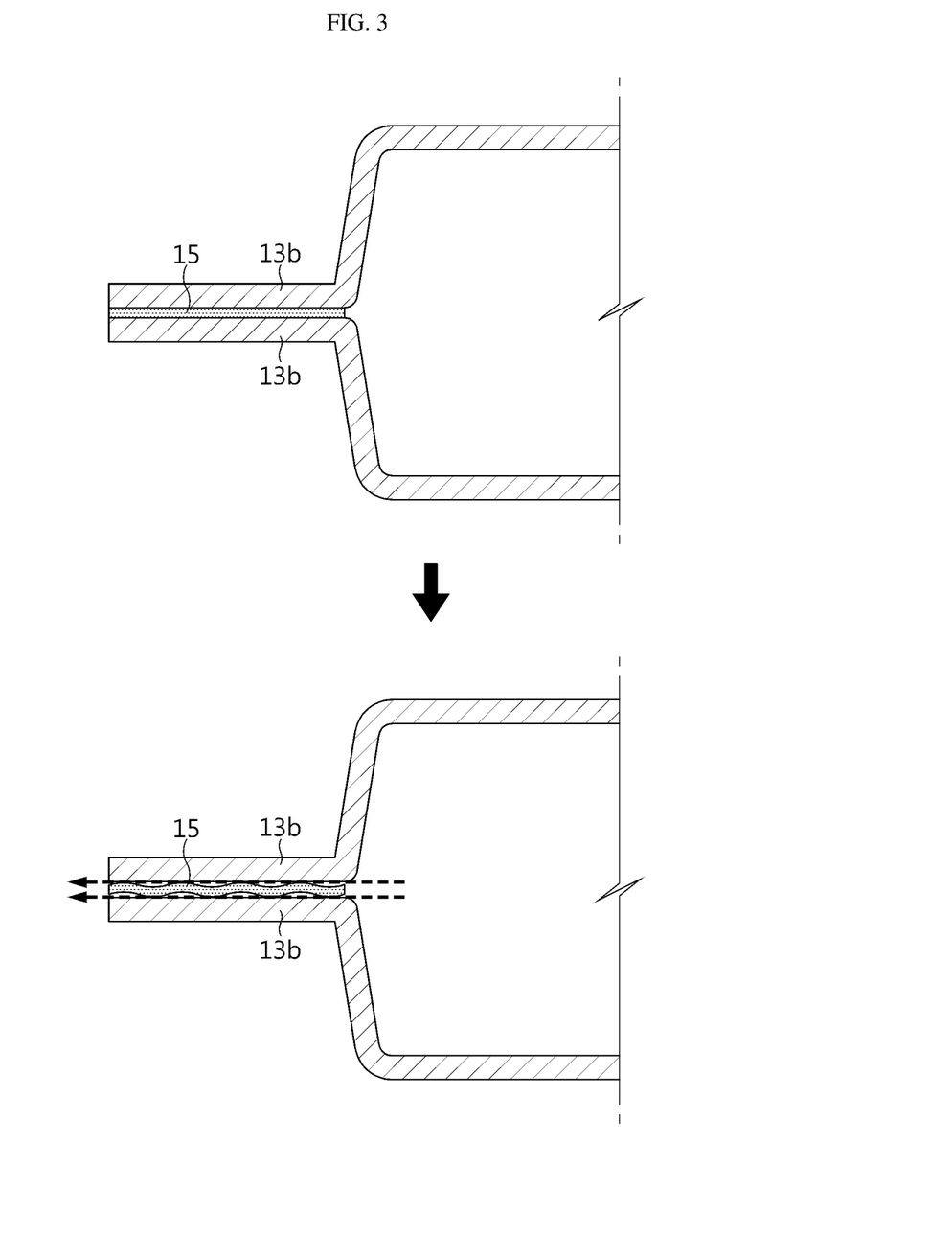
FIG. 3 is a diagram showing a state in which a vent occurs in the secondary battery according to an embodiment of the present disclosure.

FIG. 3 is a diagram showing a state in which a vent occurs in the secondary battery according to an embodiment of the present disclosure. Specifically, FIG. 3 is a cross-sectional view showing the vent member in the secondary battery according to an embodiment of the present disclosure.

Referring to FIG. 3, at a temperature at which the battery normally operates, the vent member serves to seal the case from the outside. If the temperature of the battery is excessively increased due to abnormal operation of the battery, the sealing strength of the portion into which the vent member is inserted is reduced as the vent member melts. Accordingly, the discharging gas may be guided to this portion. For example, as the pressure of the gas inside the battery is applied to the interface between the vent member and the battery case, a gap is formed between the vent member and the battery case, thereby guiding the discharge of the gas thereto.

In an embodiment of the present disclosure, the vent member 15 may contain linear low-density polyethylene having a comonomer with a carbon number of 6 to 8.

In an embodiment of the present disclosure, the linear low-density polyethylene having a comonomer with a carbon number of 6 or more may have a lower melting point than the sealant resin. If the linear low-density polyethylene having a comonomer with a carbon number of 6 or more has a lower melting point than the sealant resin, the linear low-density polyethylene may melt faster than the sealant resin at high temperature. The sealing strength of the portion where the vent member 15 is inserted may be further lowered compared to the sealing strength of the case portion containing the sealant resin at high temperature, so that the venting characteristic may be readily implemented.

In an embodiment of the present disclosure, the linear low-density polyethylene having a comonomer with a carbon number of 6 or more may have a melting point of 100° C. to 130° C., or 105° C. to 125° C., or 110° C. to 120° C. If the linear low-density polyethylene having a comonomer with a carbon number of 6 or more satisfies the above-mentioned range, the sealing strength of the case 13 in which the vent member 15 is inserted may be lowered at a high temperature, for example 100° C. or higher, so that the venting characteristic may be readily implemented.

The melting point of the linear low-density polyethylene having a comonomer with a carbon number of 6 or more may be measured using a differential scanning calorimeter (DSC). For example, the temperature of a sample is increased from 30° C. to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the melting point may be measured by maintaining the temperature at 280° C. for 10 minutes.

In an embodiment of the present disclosure, the vent member 15 may be vented at 100° C. to 120° C. to expel or exhaust gases from the accommodation portion to outside the secondary battery. In particular, the vent member 15 may be vented at 100° C. to 120° C. with a pressure of 1.5 atm or more. As the vent member 15 is vented in the above-described temperature range and/or the above-mentioned pressure condition, it is easier to seal the battery during normal operation of the battery and to induce gas discharge only during abnormal operation of the battery.

In an embodiment of the present disclosure, the vent member 15 may have a maximum sealing strength of less than 6 kgf/15 mm or less than 5 kgf/15 mm or less than 4.5 kgf/15 mm at 100° C. or higher. In an embodiment of the present disclosure, the vent member 15 may have a maximum sealing strength of less than 6 kgf/15 mm or less than 5 kgf/15 mm or less than 4.5 kgf/15 mm at 100° C. to 120° C. In an embodiment of the present disclosure, the vent member 15 may have a maximum sealing strength of less than 3 kgf/15 mm or less than 2 kgf/15 mm or less than 1 kgf/15 mm or less than 0.5 kgf/15 mm at 120° C. or higher. If the vent member 15 satisfies the above-mentioned sealing strength in the above-mentioned temperature range, the sealing strength of the part of the case 13 in which the vent member 15 is inserted may be lowered at a high temperature, for example 100° C. or higher, so that the vent characteristic may be readily implemented.

In an embodiment of the present disclosure, the vent member 15 may have a maximum sealing strength of 6 kgf/15 mm or more or 8 kgf/15 mm or more or 10 kgf/15 mm or more at room temperature to 60° C. If the vent member 15 satisfies the above-mentioned sealing strength in the above temperature range, even if the vent member 15 is inserted, the part of the case 13 in which the vent member 15 is inserted may have excellent sealing strength during normal operation of the battery, which may easily secure the sealing property of the battery.

In an embodiment of the present disclosure, the vent member 15 may have a maximum sealing strength of less than 6 kgf/15 mm at 100° C. or higher, and the vent member 15 may have a maximum sealing strength of 6 kgf/15 mm or more at room temperature to 60° C. If the vent member 15 satisfies the sealing strength described above, the sealing strength of the part of the case 13 into which the vent member 15 is inserted may be lowered at a high temperature, for example at 100° C. or higher, so that the vent characteristic may be readily implemented. In addition, since the case 13 has excellent sealing strength during normal operation of the battery, the sealing property of the battery may be easily secured.

In an embodiment of the present disclosure, the vent member 15 may have an average sealing strength of less than 4.5 kgf/15 mm or less than 3 kgf/15 mm at 100° C. or above. In an embodiment of the present disclosure, the vent member 15 may have an average sealing strength of less than 4.5 kgf/15 mm or less than 3 kgf/15 mm at 100° C. to 120° C. In an embodiment of the present disclosure, the vent member 15 may have an average sealing strength of less than 2 kgf/15 mm or less than 1 kgf/15 mm or less than 0.5 kgf/15 mm at 120° C. or higher. If the vent member 15 satisfies the above-mentioned sealing strength in the above-mentioned temperature range, the sealing strength of the part of the case 13 in which the vent member 15 is inserted may be lowered at a high temperature, for example 100° C. or above, so that the vent characteristic may be implemented more easily.

In an embodiment of the present disclosure, the vent member 15 may have an average sealing strength of 4.5 kgf/15 mm or more or 5 kgf/15 mm or more or 6 kgf/15 mm or more or 7 kgf/15 mm or more at room temperature to 60° C. If the vent member 15 satisfies the above-mentioned sealing strength in the above temperature range, even if the vent member 15 is inserted, the part of the case 13 in which the vent member 15 is inserted may have excellent sealing strength during normal operation of the battery, thereby easily securing the sealing property.

In an embodiment of the present disclosure, the vent member 15 may have an average sealing strength of less than 4.5 kgf/15 mm at 100° C. or above. The vent member 15 may have an average sealing strength of 4.5 kgf/15 mm or more at room temperature to 60° C. If the vent member 15 has the above-mentioned sealing strength in the above-described temperature range, the sealing strength of the part of the case 13 in which the vent member 15 is inserted may be lowered at a high temperature, for example 100° C. or above, so that the vent characteristic may be easily implemented. In addition, since the case 13 has excellent sealing strength during normal operation of the battery, the sealing property of the battery may be easily secured.

The sealing strength of the vent member 15 according to temperature may be measured by conducting a tensile test at a speed of 5 mm/min, after cutting the part of the case 13 in which the vent member 15 is inserted into a width of 15 mm and a length of 5 cm and then biting both ends thereof using a UTM jig in a state where both ends are spread to 180°.

At this time, the maximum sealing strength means a maximum value when the case 13 is broken, and the average sealing strength means an average value when the case 13 is stretched by 8 mm at 4.5 kgf/15 mm when the maximum sealing strength is 4.5 kgf/15 mm or more and an average value when the case 13 is stretched by 8 mm at the maximum sealing strength when the maximum sealing strength is less than 4.5 kgf/15 mm.

In an embodiment of the present disclosure, the linear low-density polyethylene having a comonomer with a carbon number of 6 or more may be polymerized in the presence of a metallocene catalyst. If the linear low-density polyethylene having a comonomer with a carbon number of 6 or more is polymerized in the presence of a metallocene catalyst, it may be more advantageous in terms of sealing strength and properties, compared to the case where it is polymerized in the presence of a Ziegler-Natta catalyst.

In an embodiment of the present disclosure, the content of the comonomer with a carbon number of 6 or more in the linear low-density polyethylene having a comonomer with a carbon number of 6 or more may be 15 weight % or less, or 12 weight % or less, or 11.8 weight % or less, or 10 weight % or less, or 9 weight % or less, or 8 weight % or less, or 7.6 weight % or less, based on 100 weight % of the linear low-density polyethylene having a comonomer with a carbon number of 6 or more. At the same time, the content of the comonomer with a carbon number of 6 or more may be 5 weight % or more, or 7.6 weight % or more, or 8 weight % or more, or 9.0 weight % or more, or 10 weight % or more, or 11.8 weight % or more, or 12 weight % or more, compared to 100 weight % off the linear low-density polyethylene having a comonomer with a carbon number of 6 or more. If the content of the comonomer with a carbon number of 6 or more satisfies the above-mentioned range, it may be easy to ensure that the sealing strength is not lowered during normal operation of the battery due to a decreased packing density between molecules.

The content of the comonomer with a carbon number of 6 or more may be measured using an H-NMR. For example, after about 10 mg of a sample is completely dissolved in about 0.6 mL of trichloroethylene solvent using a heat gun, it may be sampled in an NMR tube and measured using the H-NMR.

In an embodiment of the present disclosure, the linear low-density polyethylene having a comonomer with a carbon number of 6 or more may have a weight-average molecular weight of 100,000 g/mol to 400,000 g/mol, or 200,000 g/mol to 350,000 g/mol, or 230,000 g/mol to 300,000 g/mol. If the weight-average molecular weight of the linear low-density polyethylene having a comonomer with a carbon number of 6 or more satisfies the above-described range, the sealing strength may be improved during normal operation of the battery.

In an embodiment of the present disclosure, the linear low-density polyethylene having a comonomer with a carbon number of 6 or more may have a poly dispersity index (PDI) of 4 or less, or 3.8 or less, or 3.796 or less, or 3.5 or less, or 3.023 or less, or 3 or less, or 2.7 or less, or 2.674 or less. In addition, the poly dispersity index (PDI) may be 1.0 or more. If the poly dispersity index of the linear low-density polyethylene having a comonomer with a carbon number of 6 or more satisfies the above range, the molecular weight distribution is narrow, so the sealing strength and properties may be more excellent during normal operation of the battery.

The weight-average molecular weight and the poly dispersity index of the linear low-density polyethylene having a comonomer with a carbon number of 6 or more may be measured by gel permeation chromatography (GPC) under the following conditions.

column: Tosoh, HLC-8321 GPC/HT
   solvent: TCB (Trichlorobenzene)+0.04% BHT (after drying with 0.1% $CaCl_2$)
   flow velocity: 1.0 ml/min
   sample concentration: 1.5 mg/ml
   dose: 300 µl
   column temperature: 160° C.
   Detector: RI detector
   Standard: Polystyrene (calibrated with a third-order function)

In an embodiment of the present disclosure, the crystallization temperature of the sealant resin and the crystallization temperature of the linear low-density polyethylene having a comonomer with a carbon number of 6 or more may be similar. For example, the difference between the crystallization temperature of the sealant resin and the crystallization temperature of the linear low-density polyethylene having a comonomer with a carbon number of 6 or more may be 10° C. or less, or 5° C. or less. In addition, the difference between the crystallization temperature of the sealant resin and the crystallization temperature of the linear low-density polyethylene having a comonomer with a carbon number of 6 or more may be 0.1° C. or more. If the difference between the crystallization temperature of the sealant resin and the crystallization temperature of the linear low-density polyethylene having a comonomer with a carbon number of 6 or more satisfies the above range, the sealant resin and the linear low-density polyethylene having a comonomer with a carbon number of 6 or more may have more excellent fusion characteristic during normal operation of the battery.

In an embodiment of the present disclosure, the linear low-density polyethylene having a comonomer with a carbon number of 6 or more may have a crystallization temperature of 90° C. to 115° C., or 95° C. to 110° C., or 100° C. to 110° C., or 105° C. to 110° C. If the crystallization temperature of the linear low-density polyethylene having a comonomer with a carbon number of 6 or more satisfies the above range, the sealant resin and the linear low-density polyethylene having a comonomer with a carbon number of 6 or more may have improved fusion characteristics.

In an embodiment of the present disclosure, the difference between the crystallization temperature of the sealant resin and the crystallization temperature of the linear low-density polyethylene having a comonomer with a carbon number of 6 or more may be 10° C. or less, and the linear low-density polyethylene having a comonomer with a carbon number of 6 or more may have a crystallization temperature of 90° C. to 115° C.

The crystallization temperature may be measured using a differential scanning calorimeter (DSC). For example, the temperature of the sample may be increased from 30° C. to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the crystallization temperature may be measured by maintaining the temperature at 280° C. for 10 minutes.

In an embodiment of the present disclosure, the vent member 15 may have various shapes so that gas is easily directed toward the vent region. For example, the vent member 15 may have a film shape.

The vent member 15 may be formed to have a predetermined thickness of a preset size.

In an embodiment of the present disclosure, as shown in FIGS. 1 and 2, the vent member (15) may be located in a sealing portion.

Referring to FIG. 2, the vent member 15 may be located in the sealing portion at a corner side of the case. For example, the vent member 15 may be located at a corner side of the sealing portion where the electrode lead 11 is exposed to the outside. Specifically, the vent member 15 may be located at the sealing portion beside the electrode leads 11, except for a region between the electrode leads 11. If the vent member 15 is located at the corner side of the sealing portion where the electrode lead 11 is exposed to the outside, the amount of gas vented toward the electrode lead 11 may be minimized, thereby further enhancing the safety of the battery.

In an embodiment of the present disclosure, if the sealing portion 13b is sealed on three sides, the bent side of the case and one end of the vent member 15 may be in close contact.

In addition, the vent member 15 may be inserted into the case 13 so that its insertion length may be varied, or its venting pressure and position may be controlled depending on the design requirements. Here, the insertion length of the vent member means a maximum value of the distance between one end and the other end of the vent member based on the protruding direction of the electrode lead.

Figure 4:
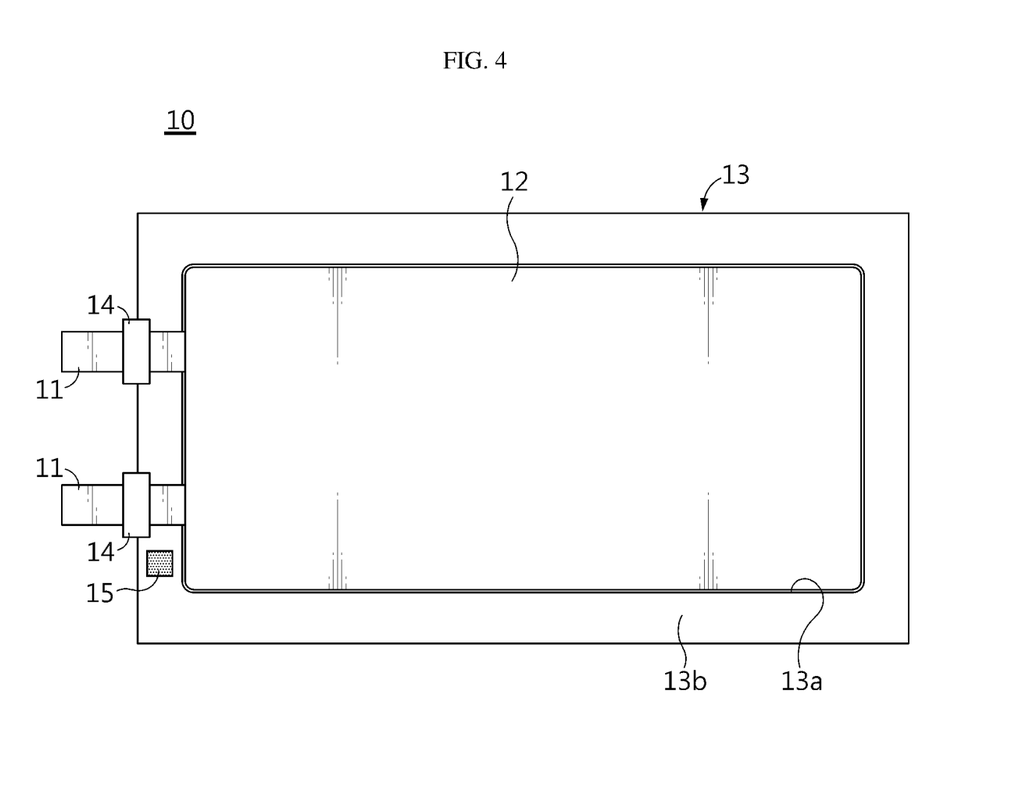
FIG. 4 is a plan view showing a secondary battery according to another embodiment of the present disclosure.

For example, as shown in FIG. 4, the insertion length of the vent member 15 may be smaller than the width of the sealing portion 13b. For example, the insertion length of the vent member 15 may be less than about 50% of the width of the sealing portion 13b. Here, the width of the sealing portion 13b means a maximum value of the distance between one end and the other end of the sealing portion 13b based on the protruding direction of the electrode lead 11.

Figure 5:
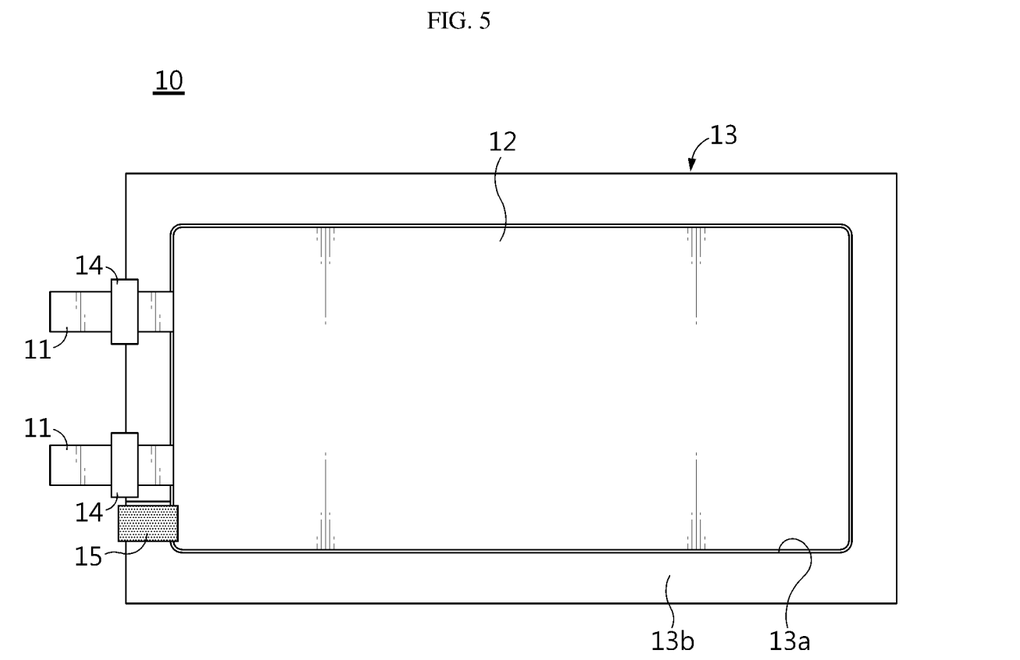
FIG. 5 is a plan view showing a secondary battery according to another embodiment of the present disclosure.

Alternatively, as shown in FIG. 5, the insertion length of the vent member 15 may be greater than the width of the sealing portion 13b. For example, the vent member 15 may be inserted to be exposed out of the case 13 through the accommodation portion 13a.

In an embodiment of the present disclosure, the vent member 15 may further include an adhesive layer for improved placement.

Figure 6:
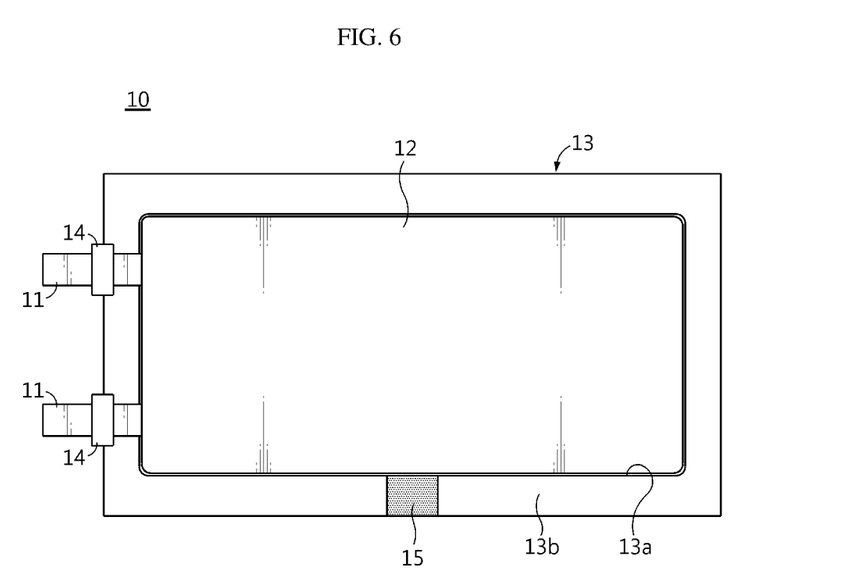
FIG. 6 is a plan view showing a secondary battery according to another embodiment of the present disclosure.

FIG. 6 is a plan view showing a secondary battery according to another embodiment of the present disclosure.

Referring to FIG. 6, the vent member 15 may be located in the sealing portion excluding a sealing portion where the electrode lead 11 is exposed to the outside.

Figure 7:
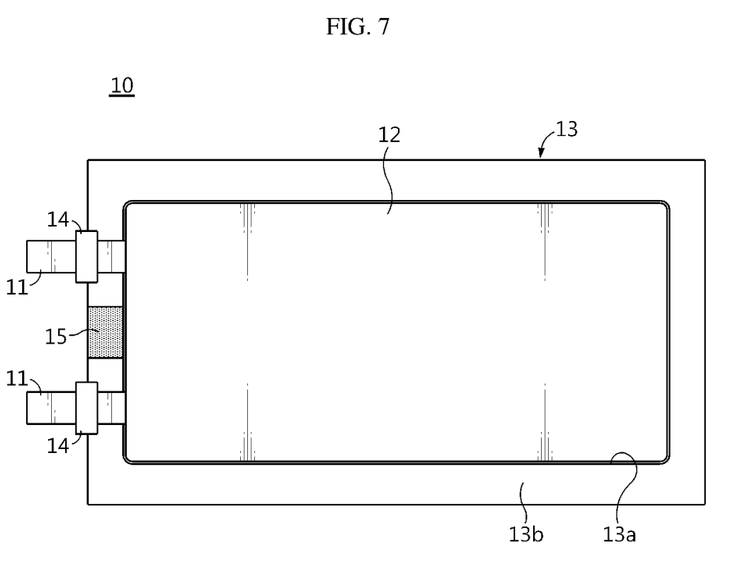
FIG. 7 is a plan view showing a secondary battery according to another embodiment of the present disclosure.

FIG. 7 is a plan view showing a secondary battery according to another embodiment of the present disclosure.

Referring to FIG. 7, the vent member 15 may be located in the sealing portion where the electrode lead 11 is exposed to the outside. For example, the vent member 15 may be located in the sealing portion between the electrode lead 11 and the electrode lead 11.

Since the secondary battery according to an embodiment of the present disclosure includes the vent member containing the linear low-density polyethylene having a comonomer with a carbon number of 6 or more, directional venting for discharging gas in a specific direction by lowering the sealing strength at high temperature may be implemented more conveniently and efficiently, thereby minimize damage to the electrode caused by gas when thermal propagation occurs—i.e., when the internal temperature of the secondary battery rise.

In an embodiment of the present disclosure, the secondary battery may be a cylindrical, prismatic, or pouch-type secondary battery. Among them, the secondary battery may be a pouch-type secondary battery.

Hereinafter, examples will be described in detail to help understanding of the present disclosure. However, embodiments according to the present disclosure may be modified in various other forms, and the scope of the present disclosure should not be construed as being limited to the following examples. Examples of the present disclosure are provided to more fully explain the present disclosure to a person with average knowledge in the art.

Example 1

After the upper pouch and the lower pouch on which poly(ethylene terephthalate))/aluminum foil/polypropylene resin are laminated in order were disposed so that the polypropylene resins face each other, an electrode assembly in which positive electrode/separator/negative electrode were stacked in order was accommodated therein.

After that, the vent member containing linear low-density polyethylene (ExxonMobile, Exceed™, 1018) having a comonomer with a carbon number of 6 polymerized in the presence of a metallocene catalyst was inserted between the polypropylene resins and then thermally fused, thereby manufacturing a secondary battery.

Example 2

A secondary battery was manufactured in the same manner as in Example 1, except that the vent member containing linear low-density polyethylene (LG Chem, Lucene™ SP311) having a comonomer with a carbon number of 6 polymerized in the presence of a metallocene catalyst was inserted between the polypropylene resins.

Example 3

A secondary battery was manufactured in the same manner as in Example 1, except that the vent member containing linear low-density polyethylene (Dow, Elite™, 5401GT) having a comonomer with a carbon number of 8 polymerized in the presence of a metallocene catalyst was inserted between polypropylene resins.

Comparative Example 1

After the upper pouch and the lower pouch on which polyethylene terephthalate (poly(ethylene terephthalate))/aluminum foil/polypropylene resin were laminated in order are disposed so that the polypropylene resins face each other, an electrode assembly in which positive electrode/separator/negative electrode were stacked in order was accommodated therein.

After that, the polypropylene resins were thermally fused, thereby manufacturing a secondary battery.

Comparative Example 2

A secondary battery was manufactured in the same manner as in Example 1, except that the vent member containing linear low-density polyethylene having a comonomer with a carbon number of 4 polymerized in the presence of a Ziegler-Natta catalyst was inserted between polypropylene resins.

Comparative Example 3

A secondary battery was manufactured in the same manner as in Example 1, except that the vent member containing high-density polyethylene (SABIC®, HDPE F04660) was inserted between the polypropylene resins.

Evaluation Example 1: Evaluation of Physical Properties of the Resin Used in the Vent Member The melting points, the comonomer contents, the weight-average molecular weights, the poly dispersity indexes, and the crystallization temperatures of the resin used in the vent members (i.e., also referred herein as 'vent resin') of Examples 1 to 3 and Comparative Example 2 and the sealant resin used in Comparative Example 1 were measured, as shown in Table 1 below.

(1) Measurement of Melting Point and Crystallization Temperature

The melting points and the crystallization temperatures of the sealant resin used in Comparative Example 1 and the vent resins used in the vent members of Examples 1 to 3 and Comparative Example 2 were measured as follows.

The temperature of the sample was increased from 30° C. to 280° C. at 10° C./min using a differential scanning calorimeter (DSC), maintained at 280° C. for 10 minutes, cooled to 30° C. at 10° C./min, and then maintained at 30° C. for 10 minutes. Thereafter, after increasing the temperature of the sample from 30° C. to 280° C. at 10° C./min, the melting point and the crystallization temperature were measured by maintaining the temperature at 280° C. for 10 minutes.

(2) Measurement of Comonomer Content

The comonomer contents of the sealant resin used in Comparative Example 1 and the vent resins used in the vent members of Examples 1 to 3 and Comparative Example 2 were measured using the H-NMR.

About 10 mg of the sample was completely dissolved in about 0.6 mL of trichloroethylene solvent using a heater gun, then sampled in an NMR tube, and measured using the H-NMR.

(3) Measurement of Weight-Average Molecular Weight and Poly Dispersity Index

The weight-average molecular weights and the poly dispersity indexes of the sealant resin used in Comparative Example 1 and the vent resins used in the vent members of Examples 1 to 3 and Comparative Example 2 were measured using gel permeation chromatography (GPC) under the following conditions.

- column: Tosoh, HLC-8321 GPC/HT
- solvent: TCB (Trichlorobenzene)+0.04% BHT (after drying with 0.1% $CaCl_2$)
- flow velocity: 1.0 ml/min
- sample concentration: 1.5 mg/ml
- dose: 300 μl
- column temperature: 160° C.
- Detector: RI detector
- Standard: Polystyrene (calibrated with a third-order function)

TABLE 1

| | Example 1 | Example 2 | Example 3 | Comparative Example 1 | Comparative Example 2 |
|---|---|---|---|---|---|
| Melting point (° C.) | 119 | 119 | 120 | 160 | 121 |
| Content of comonomer, based on entire vent resin content (weight %) | 7.6 | 9.0 | 11.8 | 6 | 5.1 |
| Weight-average molecular weight (g/mol) | 289,053 | 270,756 | 251,521 | 327,862 | 272,870 |
| Poly dispersity index | 3.023 | 2.674 | 3.796 | 4.27 | 4.761 |
| Crystallization temperature (° C.) | 106 | 107 | 105 | 106 | 107 |

Evaluation Example 2: Measurement of Sealing Strength According to Temperature

In the secondary batteries prepared in Examples 1 to 3 and Comparative Examples 2 to 3, a tensile test was conducted at a speed of 5 mm/min, after cutting the part of the case in which the vent member was inserted into a width of 15 mm and a length of 5 cm at the following temperature and then gripping both ends thereof using a UTM jig in a state where both ends are spread to 180°. The sealing strength of the case at this time is shown in Table 2 below.

In the secondary battery prepared in Comparative Example 1, a tensile test was conducted at a speed of 5 mm/min, after cutting the case of the sealing portion into a width of 15 mm and a length of 5 cm at the following temperature and then gripping both ends thereof using a UTM jig in a state where both ends are spread to 180°. The sealing strength of the case at this time is shown in Table 2 below.

At this time, the maximum sealing strength means a maximum value when the case is broken, and the average sealing strength means an average value when the case is stretched by 8 mm at 4.5 kgf/15 mm when the maximum sealing strength is 4.5 kgf/15 mm or more and an average value when the case is stretched by 8 mm at the maximum sealing strength when the maximum sealing strength is less than 4.5 kgf/15 mm.

TABLE 2

| | | Example 1 | | Example 2 | | Example 3 | |
|---|---|---|---|---|---|---|---|
| | | Max. | Ave. | Max. | Ave. | Max. | Ave. |
| Sealing strength (kgf/15 mm) | Room temp. | 11.1 (±0.6) | 9.4 (±0.2) | 14.6 (±3.0) | 9.5 (±0.1) | 13.8 (±1.1) | 9.0 (±0.01) |
| | 60° C. | 7.2 (±0.8) | 5.9 (±0.8) | 13.3 (±0.6) | 7.6 (±0.0) | 10.0 (±1.8) | 7.0 (±0.1) |
| | 100° C. | 1.7 (±0.3) | 1.5 (±0.1) | 3.6 (±0.9) | 2.7 (±0.2) | 1.1 (±0.2) | 0.3 (±0.1) |
| | 120° C. | 0.5 | 0.3 | 0.06 | 0.05 | 0.06 (±0.02) | 0.02 (±0.01) |

| | | Com. Ex. 1 | | Com. Ex. 2 | | Com. Ex. 3 | |
|---|---|---|---|---|---|---|---|
| | | Max. | Ave. | Max. | Ave. | Max. | Ave. |
| Sealing strength (kgf/15 mm) | Room temp. | 13.9 (±0.5) | 9.7 (±0.1) | 0.5 (±0.2) | — | 1.2 (±0.3) | — |
| | 60° C. | 12.9 (±1.1) | 7.2 (±0.1) | 0.1 (±0.0) | — | 0.6 (±0.1) | — |
| | 100° C. | 9.6 (±0.3) | 6.2 (±0.1) | — | — | — | — |
| | 120° C. | 7.0 (±0.4) | 5.8 (±0.1) | — | — | — | — |

As seen in Table 2, it was determined that a maximum sealing strength and an average sealing strength at room temperature to 60° C. of the part of the case in which the vent member is inserted of the secondary batteries manufactured in Examples 1 to 3 were similar to a maximum sealing strength and an average sealing strength at room temperature to 60° C. of the case of the secondary battery manufactured in Comparative Example 1. In addition, a maximum sealing strength and an average sealing strength at 100° C. or above of the part of the case in which the vent member is inserted of the secondary batteries manufactured in Examples 1 to 3 were significantly lower than a maximum sealing strength and an average sealing strength at 100° C. or above of the case of the secondary battery manufactured in Comparative Example 1.

Accordingly, the secondary battery having the vent member manufactured in Examples 1 to 3 may ensure proper sealing strength during normal operation of the battery, and may discharge gas through the vent member having a weakened sealing strength when the battery is heated to high temperature due to an abnormal phenomenon. The secondary battery manufactured in Comparative Example 1 may secure proper sealing strength during normal operation of the battery. However, when the battery is heated to high temperature due to an abnormal phenomenon, gas is discharged in unspecified directions, which would cause ignition of the battery.

In the secondary batteries manufactured in Comparative Examples 2 and 3, a maximum sealing strength and an average sealing strength at room temperature to 60° C. of the part of the case in which the vent member is inserted were significantly lower than a maximum sealing strength and an average sealing strength at room temperature to 60° C. of the case of the secondary battery manufactured in Examples 1 to 3. At a temperature of 100° C. or above, the sealing strength was too low to be measured. From this, it was determined that the secondary batteries manufactured in Comparative Examples 2 and 3 cannot secure proper sealing strength during normal operation of the battery.

What is claimed is:

1. A secondary battery, comprising:
   an electrode assembly;
   an electrode lead attached to the electrode assembly;
   a case configured to receive the electrode assembly therein;
   a lead film configured to surround a part of an outer surface of the electrode lead, the lead film being interposed between the electrode lead and the case;
   a vent region formed in at least a part of the case; and
   a vent member inserted into the vent region, wherein the vent member contains linear low-density polyethylene having a comonomer with a carbon number of 6 or more,
   wherein a content of the comonomer with the carbon number of 6 or more is from 5 weight % to 15 weight % based on 100 weight % of the linear low-density polyethylene, and
   wherein the vent member has a maximum sealing strength of 6 kgf/15 mm or more at room temperature to 60° C.

2. The secondary battery according to claim 1,
   wherein the vent member contains linear low-density polyethylene having a comonomer with a carbon number of 6 to 8.

3. The secondary battery according to claim 1,
   wherein the case includes a sealing portion formed to seal the electrode assembly,
   the sealing portion contains a sealant resin, and
   the linear low-density polyethylene of the vent member has a lower melting point than the sealant resin.

4. The secondary battery according to claim 3,
   wherein a difference between a crystallization temperature of the sealant resin and a crystallization temperature of the linear low-density polyethylene is 10° C. or less.

5. The secondary battery according to claim 4,
   wherein the linear low-density polyethylene has a crystallization temperature of 90° C. to 115° C.

6. The secondary battery according to claim 3,
   wherein the vent region is located in the sealing portion.

7. The secondary battery according to claim 6,
   wherein the vent region is located in the sealing portion at a corner of the case.

8. The secondary battery according to claim 1,
   wherein the vent member melts at 100° C. to 120° C. to vent gases.

9. The secondary battery according to claim 8,
   wherein the vent member is vented at a pressure of 1.5 atm or more.

10. The secondary battery according to claim 1,
    wherein the vent member has a maximum sealing strength of less than 6 kgf/15 mm at 100° C. or above.

11. The secondary battery according to claim 1,
    wherein the vent member has an average sealing strength of less than 4.5 kgf/15 mm at 100° C. or above.

12. The secondary battery according to claim 1,
    wherein the vent member has an average sealing strength of 4.5 kgf/15 mm or more at room temperature to 60° C.

13. The secondary battery according to claim 1,
    wherein the linear low-density polyethylene is made by polymerizing in the presence of a metallocene catalyst.

14. The secondary battery according to claim 1,
    wherein the linear low-density polyethylene has a poly dispersity index (PDI) of 4 or less.

15. The secondary battery according to claim 1,
    wherein the linear low-density polyethylene has a melting point of 100° C. to 130° C.

16. The secondary battery according to claim 1,
    wherein the linear low-density polyethylene has a weight-average molecular weight of 100,000 g/mol to 400,000 g/mol.

17. The secondary battery according to claim 1,
    wherein the secondary battery is a pouch-type secondary battery.

18. The secondary battery according to claim 1,
    wherein the vent member has a maximum sealing strength of less than 6 kgf/15 mm at 100° C. to 120° C.

19. The secondary battery according to claim 1,
    wherein the vent member has an average sealing strength of less than 4.5 kgf/15 mm at 100° C. to 120° C.

20. The secondary battery according to claim 1,
    wherein the linear low-density polyethylene has a poly dispersity index (PDI) of from 1 to 4.

21. The secondary battery according to claim 1,
    wherein the vent member has a maximum sealing strength of less than 3 kgf/15 mm at 120° C. or more.

22. The secondary battery according to claim 1,
    wherein the vent member has an average sealing strength of less than 2 kgf/15 mm at 120° C. or more.

* * * * *